United States Patent
Weksler et al.

(10) Patent No.: US 12,086,232 B2
(45) Date of Patent: Sep. 10, 2024

(54) APPARATUS, METHOD, AND PROGRAM PRODUCT FOR SELECTING AN AUTHENTICATION MEDIUM

(71) Applicant: LENOVO (Singapore) PTE. LTD., New Tech Park (SG)

(72) Inventors: Arnold S. Weksler, Raleigh, NC (US); John C. Mese, Cary, NC (US); Nathan J. Peterson, Oxford, NC (US); Russell Speight VanBlon, Raleigh, NC (US); Mark Patrick Delaney, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 105 days.

(21) Appl. No.: 17/205,425

(22) Filed: Mar. 18, 2021

(65) Prior Publication Data

US 2022/0300601 A1   Sep. 22, 2022

(51) Int. Cl.
| | | |
|---|---|---|
| G06F 21/00 | (2013.01) | |
| G06F 21/35 | (2013.01) | |
| G06F 21/44 | (2013.01) | |
| G06F 21/45 | (2013.01) | |

(52) U.S. Cl.
CPC .............. *G06F 21/45* (2013.01); *G06F 21/35* (2013.01); *G06F 21/44* (2013.01)

(58) Field of Classification Search
CPC ........... G06F 21/35; G06F 21/44; G06F 21/45
See application file for complete search history.

(56) References Cited

U.S. PATENT DOCUMENTS

| | | |
|---|---|---|
| 2003/0097593 A1 | 5/2003 | Sawa et al. |
| 2010/0011070 A1* | 1/2010 | Zhao ............. H04L 51/224 |
| | | 709/227 |
| 2012/0176413 A1 | 7/2012 | Kulik et al. |

(Continued)

FOREIGN PATENT DOCUMENTS

| | | |
|---|---|---|
| JP | 2003030154 A | 1/2003 |
| JP | 2007334637 A | 12/2007 |

(Continued)

OTHER PUBLICATIONS

U.S. Appl. No. 15/977,924, "Office Action Summary", Jan. 7, 2020, pp. 1-23.

(Continued)

*Primary Examiner* — Rodman Alexander Mahmoudi
(74) *Attorney, Agent, or Firm* — Kunzler Bean & Adamson

(57) ABSTRACT

Apparatuses, methods, and program products are disclosed for selecting an authentication medium. One apparatus includes at least one processor and a memory that stores code executable by the at least one processor. The code is executable by the processor to receive, by use of the at least one processor, an indication to authenticate a user. The code is executable by the processor to, in response to receiving the indication to authenticate the user, detect a physical availability of a preferred authentication medium of a list of authentication mediums. The code is executable by the processor to, in response to detecting that the preferred authentication medium is physically unavailable, select a physically available authentication medium from the list of authentication mediums to authenticate the user.

20 Claims, 5 Drawing Sheets

(56) References Cited

U.S. PATENT DOCUMENTS

| | | | |
|---|---|---|---|
| 2015/0128252 A1 | 5/2015 | Konami | |
| 2017/0111340 A1 | 4/2017 | Gomi et al. | |
| 2017/0374284 A1 | 12/2017 | Shao | |
| 2018/0330068 A1 | 11/2018 | Mori | |
| 2019/0222424 A1* | 7/2019 | Lindemann | H04L 9/3231 |
| 2019/0318114 A1* | 10/2019 | Holt | H04L 63/108 |
| 2021/0385215 A1* | 12/2021 | Summers | H04L 63/0861 |

FOREIGN PATENT DOCUMENTS

| | | |
|---|---|---|
| JP | 2013-174955 A | 9/2013 |
| JP | 2017060103 A | 3/2017 |

OTHER PUBLICATIONS

U.S. Appl. No. 15/977,924, "Final Office Action Summary", Jun. 4, 2020, pp. 1-17.
U.S. Appl. No. 15/977,924, "Office Action Summary", Sep. 14, 2020, pp. 1-18.
U.S. Appl. No. 15/977,924, "Final Office Action Summary", Dec. 15, 2021, pp. 1-17.

* cited by examiner

APPARATUS, METHOD, AND PROGRAM PRODUCT FOR SELECTING AN AUTHENTICATION MEDIUM

FIELD

The subject matter disclosed herein relates to information handling devices and more particularly relates to selecting an authentication medium.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions, such as authentication. Authentication mediums may not always be available for use.

BRIEF SUMMARY

An apparatus for selecting an authentication medium is disclosed. A method and computer program product also perform the functions of the apparatus. In one embodiment, the apparatus includes at least one processor and a memory that stores code executable by the at least one processor. The code, in various embodiments, is executable by the processor to receive, by use of the at least one processor, an indication to authenticate a user. The code, in certain embodiments, is executable by the processor to, in response to receiving the indication to authenticate the user, detect a physical availability of a preferred authentication medium of a list of authentication mediums. The code, in some embodiments, is executable by the processor to, in response to detecting that the preferred authentication medium is physically unavailable, select a physically available authentication medium from the list of authentication mediums to authenticate the user.

In some embodiments, the preferred authentication medium includes a last used authentication medium. In one embodiment, the preferred authentication medium includes a user selected authentication medium.

In various embodiments, the preferred authentication medium includes a most secure authentication medium. In some embodiments, the preferred authentication medium includes a camera, a fingerprint scanner, a retinal scanner, a keyboard, a cell phone, a touchscreen, and/or a mouse.

A method for selecting an authentication medium, in one embodiment, includes receiving, by use of at least one processor, an indication to authenticate a user. In certain embodiments, the method includes, in response to receiving the indication to authenticate the user, detecting a physical availability of a preferred authentication medium of a list of authentication mediums. In some embodiments, the method includes, in response to detecting that the preferred authentication medium is physically unavailable, selecting a physically available authentication medium from the list of authentication mediums to authenticate the user.

In some embodiments, the preferred authentication medium includes a last used authentication medium. In various embodiments, the preferred authentication medium includes a user selected authentication medium. In one embodiment, the preferred authentication medium includes a most secure authentication medium. In some embodiments, the preferred authentication medium includes a camera, a fingerprint scanner, a retinal scanner, a keyboard, a cell phone, a touchscreen, and/or a mouse. In certain embodiments, detecting the physical availability of the preferred authentication medium includes detecting whether the preferred authentication medium is in electrical communication with the at least one processor, detecting whether the preferred authentication medium is within a threshold distance from the at least one processor, determining whether the preferred authentication medium is obstructed, and/or determining whether data obtained from the preferred authentication medium has a quality above a threshold quality level.

In some embodiments, the list of authentication mediums to authenticate the user is ranked from most preferred authentication medium to least preferred authentication medium. In various embodiments, the physically available authentication medium selected from the list of authentication mediums is ranked higher in the list of authentication mediums than other physically available authentication mediums in the list of authentication mediums. In certain embodiments, the method includes receiving user input to rank the list of authentication mediums. In some embodiments, the method includes using historical data to rank the list of authentication mediums.

In one embodiment, a program product includes a computer readable storage medium that stores code executable by at least one processor. The executable code, in certain embodiments, includes code to perform receiving, by use of the at least one processor, an indication to authenticate a user. The executable code, in various embodiments, includes code to perform, in response to receiving the indication to authenticate the user, detecting a physical availability of a preferred authentication medium of a list of authentication mediums. The executable code, in some embodiments, includes code to perform, in response to detecting that the preferred authentication medium is physically unavailable, selecting a physically available authentication medium from the list of authentication mediums to authenticate the user.

In certain embodiments, detecting the physical availability of the preferred authentication medium includes detecting whether the preferred authentication medium is in electrical communication with the at least one processor, detecting whether the preferred authentication medium is within a threshold distance from the at least one processor, determining whether the preferred authentication medium is obstructed, and/or determining whether data obtained from the preferred authentication medium has a quality above a threshold quality level. In one embodiment, the list of authentication mediums to authenticate the user is ranked from most preferred authentication medium to least preferred authentication medium.

In certain embodiments, the physically available authentication medium selected from the list of authentication mediums is ranked higher in the list of authentication mediums than other physically available authentication mediums in the list of authentication mediums. In some embodiments, the executable code further includes code to perform receiving user input to rank the list of authentication mediums.

BRIEF DESCRIPTION OF TIE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
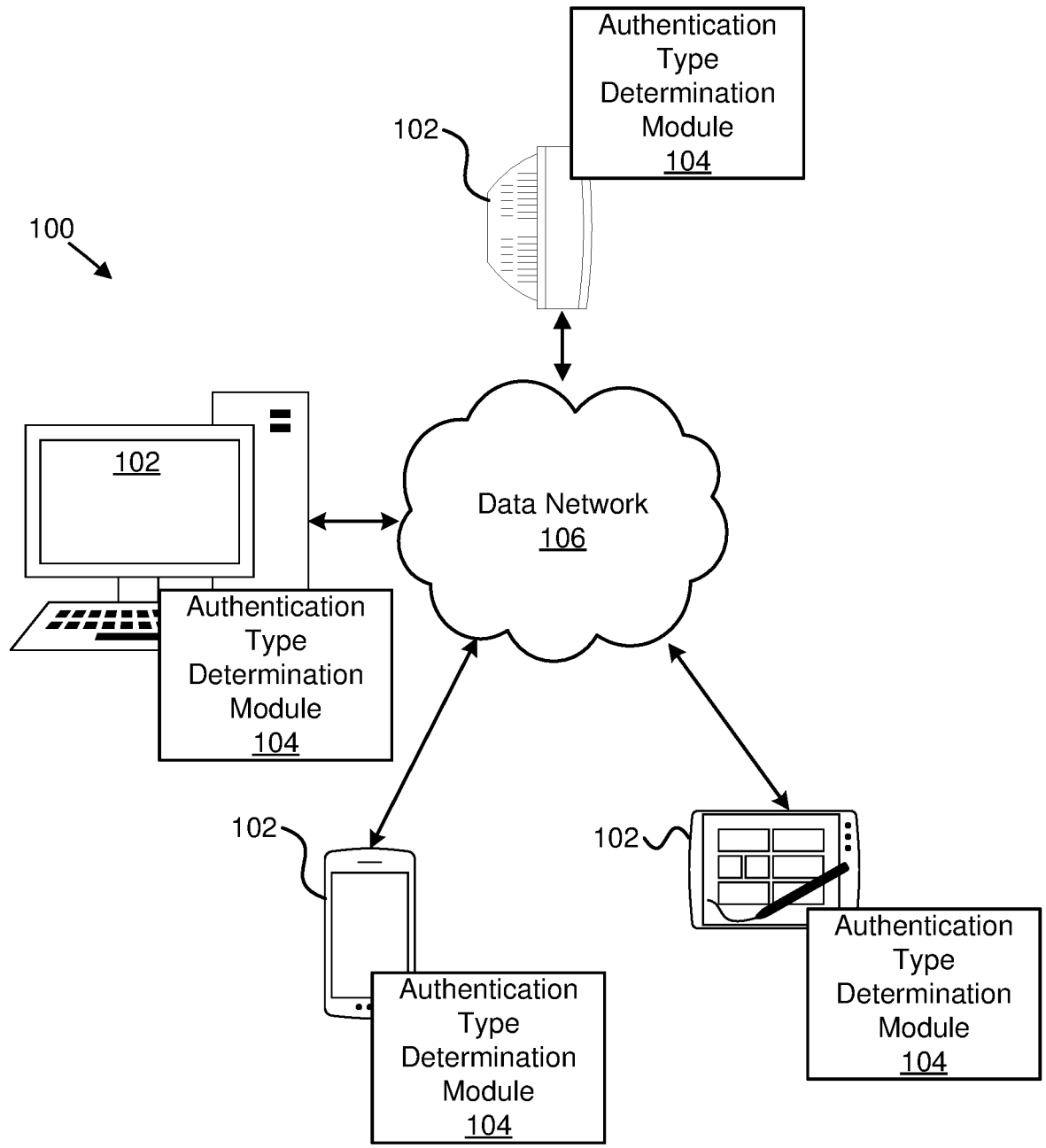
FIG. 1 is a schematic block diagram illustrating one embodiment of a system for selecting an authentication medium.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for selecting an authentication medium. In one embodiment, the system 100 includes information handling devices 102, authentication type determination modules 104, and data networks 106. Even though a specific number of information handling devices 102, authentication type determination modules 104, and data networks 106 are depicted in FIG. 1, one of skill in the art will recognize that any number of information handling devices 102, authentication type determination modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the authentication type determination module 104. In certain embodiments, the authentication type determination module 104 may receive, by use of the at least one processor (e.g., processor 202), an indication to authenticate a user. The authentication type determination module 104 may also, in response to receiving the indication to authenticate the user, detect a physical availability of a preferred authentication medium of a list of authentication mediums. The authentication type determination module 104 may, in response to detecting that the preferred authentication medium is physically unavailable, select a physically available authentication medium from the list of authentication mediums to authenticate the user. In this manner, the authentication type determination module 104 may be used for selecting an authentication medium.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
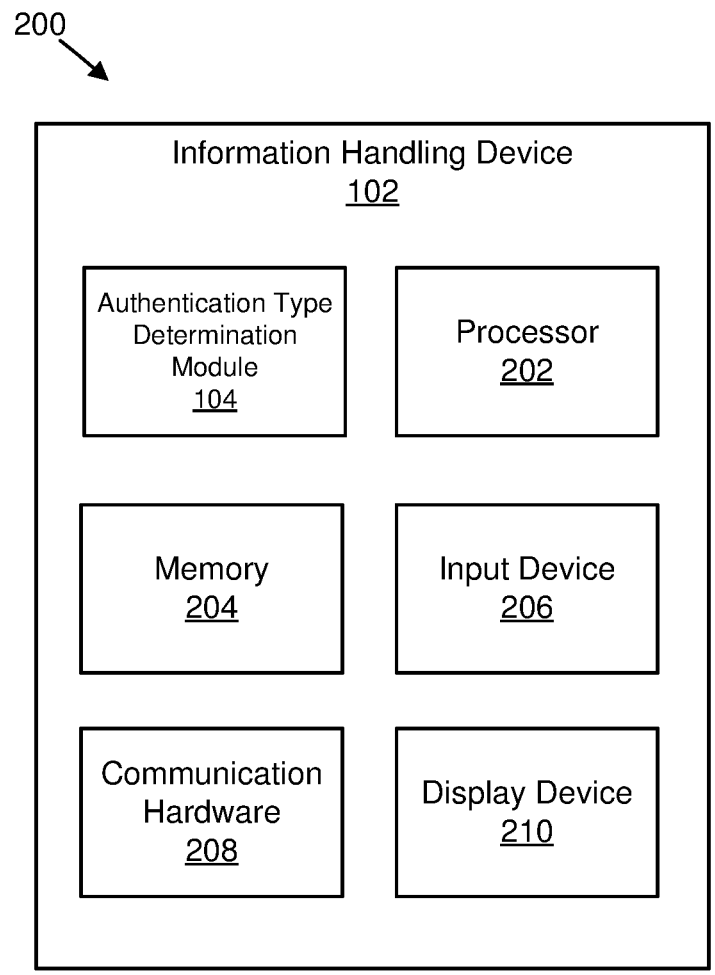
FIG. 2 is a schematic block diagram illustrating one embodiment of an apparatus including an information handling device.

FIG. 2 depicts one embodiment of an apparatus 200 that may be used for selecting an authentication medium. The apparatus 200 includes one embodiment of the information handling device 102. Furthermore, the information handling device 102 may include the authentication type determination module 104, a processor 202, a memory 204, an input device 206, communication hardware 208, and optionally a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the authentication type determination module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102.

The information handling device 102 may use the authentication type determination module 104 for selecting an authentication medium. As may be appreciated, the authentication type determination module 104 may include computer hardware, computer software, or a combination of both computer hardware and computer software. For example, the authentication type determination module 104 may include circuitry, or the processor 202, used to receive, by use of at least one processor (e.g., the processor 202), an indication to authenticate a user. As another example, the authentication type determination module 104 may include computer program code that, in response to receiving the indication to authenticate the user, detect a physical availability of a preferred authentication medium of a list of authentication mediums. As a further example, the authentication type determination module 104 may include computer program code that, in response to detecting that the preferred authentication medium is physically unavailable, select a physically available authentication medium from the list of authentication mediums to authenticate the user.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the authentication type determination module 104.

In various embodiments, a login method (e.g., medium used) may default to a last used login method. This may be problematic because a physical state of an information handling device 102 may have changed since the last use. For example, a user may have used a camera for face detection the last time they logged into a clamshell type laptop and now the clamshell type laptop may be partially closed so that the camera is now facing the keyboard, the camera is facing harsh lighting, and/or the user is lo longer in view of the camera. In such an example, the camera may first attempt to authenticate and after timing out with an unsuccessful authentication, then the computer may prompt the user for an alternate login. As such, if the primary authentication method fails, the user has to next select from a choice of options for authentication (e.g., logging in).

In some embodiments, a user of an information handling device 102 may desire to improve the speed of authentication by an information handling device 102 automatically selecting authentication methods that are physically available. Described herein are various embodiments that use an authentication type determination module 104 to select an authentication medium that is physically available.

Figure 3:
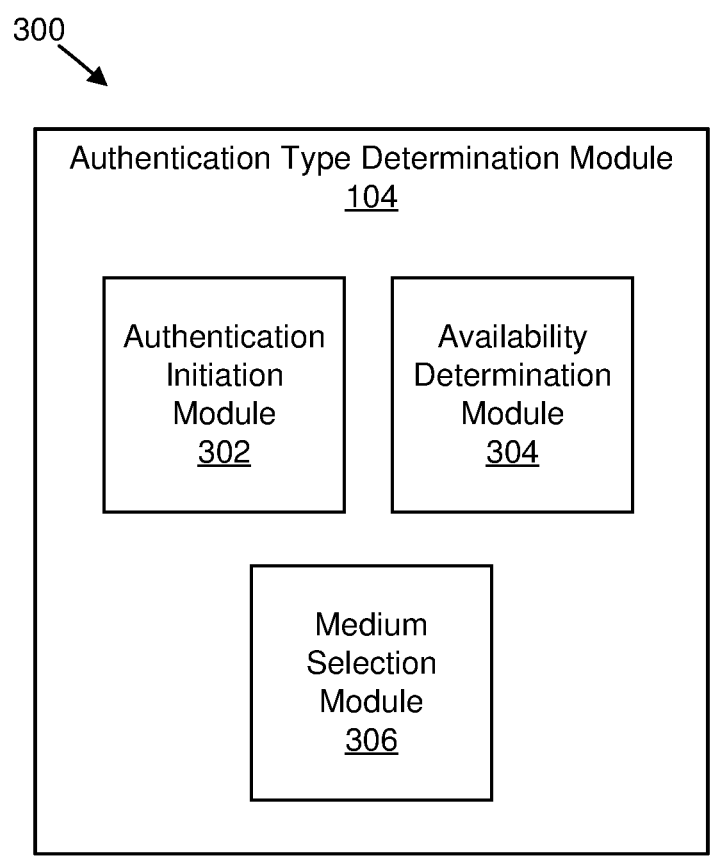
FIG. 3 is a schematic block diagram illustrating one embodiment of an apparatus including an authentication type determination module.

FIG. 3 depicts a schematic block diagram illustrating one embodiment of an apparatus 300 (e.g., information handling device 102) that includes one embodiment of the authentication type determination module 104. Furthermore, the authentication type determination module 104 includes an authentication initiation module 302, an availability determination module 304, and a medium selection module 306.

In certain embodiments, the authentication initiation module 302 may receive, by use of at least one processor (e.g., the processor 202), an indication to authenticate a user (e.g., an indication to initiate an authentication method, an indication to log in a user). The indication to authenticate the user may be caused by moving a mouse, clicking a mouse button, pressing at least one key on a keyboard (e.g., a single key or a set of keys), and/or touching a touch screen on an information handling device 102 that requires authentication (e.g., requires logging in). For example, an information handling device 102 that has been locked, has not been used for a period of time, and/or has gone to sleep may require authentication. In response to moving the mouse, clicking the mouse button, pressing the at least one key on the keyboard, and/or touching the touch screen, a software interrupt may be sent to an operating system. In response to the software interrupt, authentication of the user may be initiated by the operating system.

In one embodiment, the availability determination module 304 may, in response to receiving the indication to authenticate the user (e.g., as a result of receiving the indication, following receiving the indication, directly following receiving the indication, triggered by the indication), detect a physical availability of a preferred authentication medium of a list of authentication mediums. In some embodiments, the preferred authentication medium may include a last used authentication medium, a user selected authentication medium, and/or a most secure authentication medium. In various embodiments, the preferred authentication medium may include a microphone, a camera, a fingerprint scanner, a retinal scanner, a keyboard, a cell phone, a touchscreen, and/or a mouse.

In certain embodiment, detecting the physical availability of the preferred authentication medium includes detecting whether the preferred authentication medium is in electrical communication with the at least one processor, detecting whether the preferred authentication medium is within a threshold distance from the at least one processor, determining whether the preferred authentication medium is obstructed, and/or determining whether data obtained from the preferred authentication medium has a quality above a threshold quality level.

As used herein, physical availability may indicate whether a medium is physically accessible (e.g., whether a user can touch a keyboard, mouse, or touchpad, whether a user can touch a fingerprint sensor, whether a user can be seen by a camera, whether a user can be seen by an optical scanner), physically convenient to use (e.g., on a normal surface of an information handling device 102, not awkward to access—such as not on a back side of a device in a certain configuration, and so forth), working correctly based on environmental factors (e.g., noise, lighting, and/or weather may affect certain authentication mediums), and/or operational (e.g., does it work, is it broken).

In some embodiments, there may be a list of authentication mediums to authenticate the user. The list of authentication mediums may include all possible authentication mediums that may be ranked from most preferred authentication medium to least preferred authentication medium. The most preferred authentication medium may be at the top of the list and/or have a low numeric value indicated (e.g., 1 for the most preferred). In contrast, the least preferred authentication medium may be at the bottom of the list and/or have a high numeric value indicated (e.g., 2, 3, 4, 5, 6, 7, 8, 9, 10, etc. for the least preferred). The most preferred authentication medium may be an authentication medium most preferred by a user and/or may be a most secure authentication medium.

In various embodiments, the medium selection module 306 may, in response to detecting that the preferred authentication medium is physically unavailable (e.g., as a result of detecting that the preferred authentication medium is physically unavailable, following receiving information indicating that the preferred authentication medium is physically unavailable, directly following receiving information indicating that the preferred authentication medium is physically unavailable, triggered by information indicating that the preferred authentication medium is physically unavailable), select a physically available authentication medium from the list of authentication mediums to authenticate the user. In certain embodiments, the physically available authentication medium selected from the list of authentication mediums is ranked higher in the list of authentication mediums than other physically available authentication mediums in the list of authentication mediums.

In some embodiments, the medium selection module 306 may determine all authentication mediums that are physically available and provide the physically available authentication mediums in a list to the user. The list may be ranked based on user preferences (e.g., use selection) and/or level of security provided by the authentication medium. In certain embodiments, the medium selection module 306 may determine all authentication mediums that are physically available and attempt to perform authentication automatically using a software selected authentication medium out of the physically available authentication mediums (e.g., not allow the user to select from the list prior to attempting authentication).

In various embodiments, the authentication type determination module 104 may receive user input to rank the list of authentication mediums. In some embodiments, the authentication type determination module 104 may use historical data to rank the list of authentication mediums. Historical data may include the last used authentication medium, a most used authentication medium, a frequency of use of an authentication medium, a number of times that an authentication medium is used, predictive information indicating a likelihood of an authentication medium to be used, a success ratio of a user's ability to authenticate with an authentication medium, and so forth.

In some embodiments, an authentication method for login may assess the state of an information handling device 102 and switch to a best option for authentication based on the state of the information handling device 102. In various embodiments, users may configure options based on a physical state of the information handling device 102. In a first example, a user uses a camera to use face detection for authentication. The laptop lid may be partially closed. When the user tries to authenticate, the computer system determines the lid location and switches to either pin or keyboard authentication since the user uses an external keyboard. In a second example, a user tries to authenticate using a fingerprint and a laptop lid is closed and covering the fingerprint reader. Again, the user may authenticate using an external keyboard. In a third example, a user authenticated last with a cell phone, but the cell phone is not in close proximity to the user. The camera is available, so face detection is used instead. In a fourth example, a camera is unable to see a user due to harsh lighting, a secondary login method is instantly displayed. These are just some examples, and as may be appreciated, there may be many more use cases and permutations. If a last used login method is not available for any number of reasons, a user may be able to configure prioritized options for secondary login methods. These prioritized methods may be configured based on a number of physical characteristics. For example, if a laptop lid is closed, if a cell phone is not available, or if user is not seen by a camera, etc., then a secondary authentication method may be used. In some embodiments, selection and/or ranking of authentication methods and/or mediums may be implemented with a graphical user interface option for a user to configure.

Figure 4:
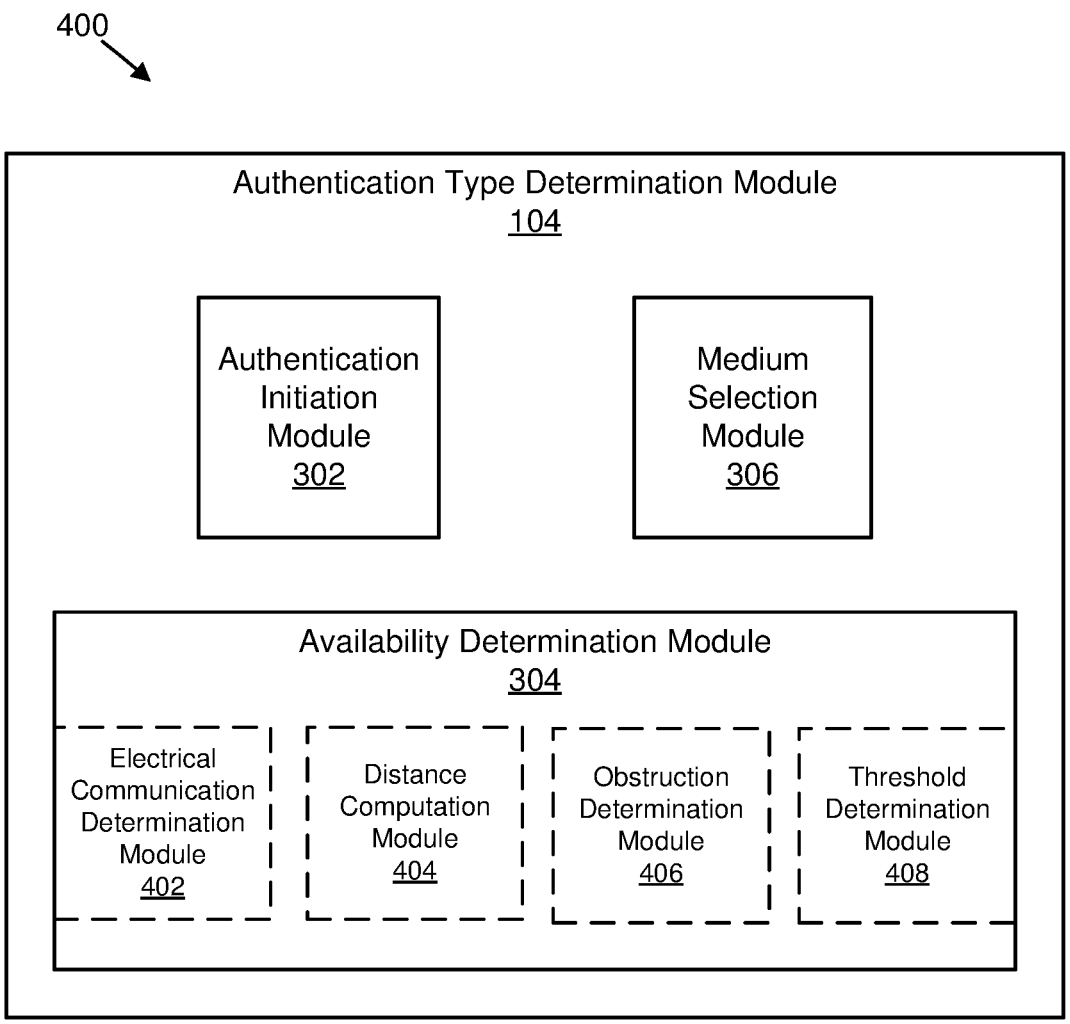
FIG. 4 is a schematic block diagram illustrating another embodiment of an apparatus including an authentication type determination module.

FIG. 4 is a schematic block diagram illustrating another embodiment of an apparatus 400 that includes one embodiment of the authentication type determination module 104. Furthermore, the authentication type determination module 104 includes one embodiment of the authentication initiation module 302, the availability determination module 304, and the medium selection module 306, that may be substantially similar to the authentication initiation module 302, the availability determination module 304, and the medium selection module 306 described in relation to FIG. 3. The availability determination module 304 may optionally include an electrical communication determination module 402, a distance computation module 404, an obstruction determination module 406, and a threshold determination module 408.

In some embodiments, the electrical communication determination module 402 may detect whether a preferred authentication medium is in electrical communication with at least one processor of an information handling device 102. For example, the electrical communication determination module 402 may detect whether a device (e.g., keyboard, mouse, camera, sensor) is in electrical communication with at least one processor of the information handling device 102 (e.g., whether a keyboard is electrically connected to the information handling device 102, whether a keyboard is plugged in, whether a wireless keyboard or mouse is communicating with the information handling device 102). If a preferred authentication medium is in electrical communication with at least one processor of an information handling device 102, it may be considered physically available under this criteria. However, being in electrical communication may only be one factor used to determine physical availability. If any factor makes an authentication medium physically unavailable, then the authentication medium is physically unavailable. If a preferred authentication medium is not in electrical communication with at least one processor of an information handling device 102, it may be considered physically unavailable (and therefore not available regardless of other factors indicating physical availability).

In some embodiments, the distance computation module 404 may detect whether the preferred authentication medium is within a threshold distance from at least one processor (or a receiver and/or transmitter) of an information handling device 102. For example, the distance computation module 404 may detect whether a device (e.g., keyboard, mouse, camera, sensor, cell phone) is within a threshold distance from at least one processor of the information handling device 102 (e.g., whether a wireless keyboard or mouse is close enough to the information handling device 102, whether a cell phone to be used for authentication is close enough to the information handling device 102). If a preferred authentication medium is within the threshold distance (e.g., 5 feet, 10 feet, 15 feet, 20 feet, communication standard distance threshold) of at least one processor (or a receiver and/or transmitter) of an information handling device 102, it may be considered physically available under this criteria. However, being within the threshold distance may only be one factor used to determine physical availability. If any factor makes an authentication medium physically unavailable, then the authentication medium is physically unavailable. If a preferred authentication medium is not within the threshold distance of at least one processor (or a receiver and/or transmitter) of an information handling device 102, it may be considered physically unavailable (and therefore not available regardless of other factors indicating physical availability).

In various embodiments, the obstruction determination module 406 may determine whether the preferred authentication medium is obstructed. For example, the preferred authentication medium may be covered (e.g., partially or fully) by another portion of the information handling device 102 or another object. In certain embodiments, the obstruction determination module 406 may include and/or access sensors (e.g., position sensor, location sensor, accelerometer, temperature sensor, etc.) to determine whether there is an obstruction. For example, the obstruction determination module 406 may access a sensor to determine a position of a laptop lid (e.g., whether the laptop lid is closed, partially open, fully open, open to another side of the laptop, etc.) If a preferred authentication medium is not obstructed, it may be considered physically available under this criteria. However, being not obstructed may only be one factor used to determine physical availability. If any factor makes an authentication medium physically unavailable, then the authentication medium is physically unavailable. If a preferred authentication medium is obstructed, it may be considered physically unavailable (and therefore not available regardless of other factors indicating physical availability).

In some embodiments, the threshold determination module 408 may determining whether data obtained from the preferred authentication medium has a quality above a threshold quality level. For example, the preferred authentication medium may provide data irregularly, abnormally, or normally. If a preferred authentication medium has a quality above the threshold quality level, it may be considered physically available under this criteria. However, having a quality above the threshold quality level may only be one factor used to determine physical availability. If any factor makes an authentication medium physically unavailable, then the authentication medium is physically unavailable. If a preferred authentication medium has a quality below the threshold quality level, it may be considered physically unavailable (and therefore not available regardless of other factors indicating physical availability). The quality of an authentication medium may be based on expected results, historic results, and so forth.

Figure 5:
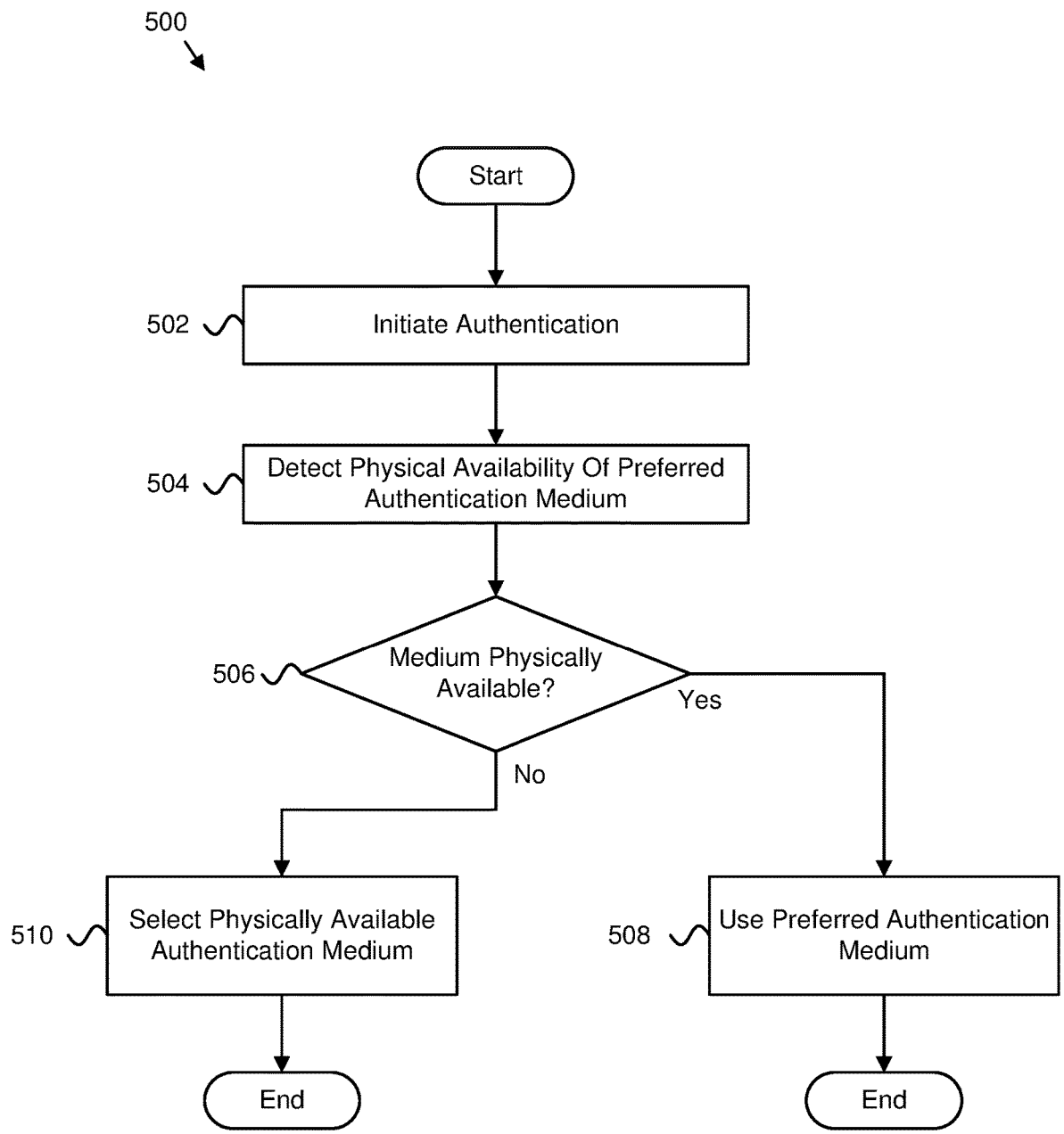
FIG. 5 is a schematic flow chart diagram illustrating an embodiment of a method for selecting an authentication medium.

FIG. 5 is a schematic flow chart diagram illustrating an embodiment of a method 500 for selecting an authentication medium. In some embodiments, the method 500 is performed by an apparatus, such as the information handling device 102. In other embodiments, the method 500 may be performed by a module, such as the authentication type determination module 104. In certain embodiments, the method 500 may be performed by a processor executing program code, for example, a microcontroller, a microprocessor, a CPU, a GPU, an auxiliary processing unit, a FPGA, or the like.

The method 500 may include initiating 502 authentication (e.g., receiving, by use of at least one processor 202, an indication to authenticate a user). In certain embodiments, the authentication initiation module 302 may initiate 502 authentication.

The method 500 may include detecting 504 physical availability of a preferred authentication medium (e.g., in response to receiving the indication to authenticate the user, detect a physical availability of a preferred authentication medium of a list of authentication mediums). In some embodiments, the availability determination module 304 may detect 504 the physical availability of the preferred authentication medium.

In some embodiments, the preferred authentication medium includes a last used authentication medium. In various embodiments, the preferred authentication medium includes a user selected authentication medium. In one embodiment, the preferred authentication medium includes a most secure authentication medium. In some embodiments, the preferred authentication medium includes a camera, a fingerprint scanner, a retinal scanner, a keyboard, a cell phone, a touchscreen, and/or a mouse. In certain embodiments, detecting 504 the physical availability of the preferred authentication medium includes detecting whether the preferred authentication medium is in electrical communication with the at least one processor, detecting whether the preferred authentication medium is within a threshold distance from the at least one processor, determining whether the preferred authentication medium is obstructed, and/or determining whether data obtained from the preferred authentication medium has a quality above a threshold quality level.

In some embodiments, the list of authentication mediums to authenticate the user is ranked from most preferred authentication medium to least preferred authentication medium.

The method 500 may include determining 506 whether the preferred authentication medium is available. In some embodiments, the availability determination module 304 may determine 506 whether the preferred authentication medium is available.

The method 500 may, if the preferred authentication medium is available, use 508 the preferred authentication medium. Moreover, the method 500 may, if the preferred authentication medium is unavailable, select 510 a physically available authentication medium (e.g., in response to detecting that the preferred authentication medium is physically unavailable, select a physically available authentication medium from the list of authentication mediums to authenticate the user). In some embodiments, the medium selection module 306 may select 510 a physically available authentication medium.

In various embodiments, the physically available authentication medium selected from the list of authentication mediums is ranked higher in the list of authentication mediums than other physically available authentication mediums in the list of authentication mediums.

In certain embodiments, the method 500 includes receiving user input to rank the list of authentication mediums. In some embodiments, the method 500 includes using historical data to rank the list of authentication mediums.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   at least one processor of an information handling device; and
   a memory that stores code executable by the at least one processor to:
   receive, by use of the at least one processor and at an operating system of the information handling device, a software interrupt, the software interrupt comprising an indication to authenticate a user into the operating system;
   in response to receiving the indication to authenticate the user, detect a factor of a component of the information handling device, the component required for a preferred authentication method of a list of authentication methods and the factor affecting a capability of the component to detect authentication data for the preferred authentication method, wherein detecting the factor of the component comprises detecting whether the component is in electrical communication with the at least one processor, detecting whether the component is within a threshold distance from the at least one processor, determining whether the component is obstructed, or some combination thereof; and
   in response to detecting the factor of the component, select a physically available authentication method from the list of authentication methods to authenticate the user into the operating system of the information handling device, the physically available authentication method including at least one of the component or an additional component of the information handling device.

2. The apparatus of claim 1, wherein the preferred authentication method comprises a last used authentication method.

3. The apparatus of claim 1, wherein the preferred authentication method comprises a user selected authentication method.

4. The apparatus of claim 1, wherein the preferred authentication method comprises a most secure authentication method.

5. The apparatus of claim 1, wherein the component comprises a camera, a fingerprint scanner, a retinal scanner, a keyboard, a cell phone, a touchscreen, a mouse, or some combination thereof.

6. A method comprising:
   receiving, by use of at least one processor of an information handling device and at an operating system of the information handling device, a software interrupt, the software interrupt comprising an indication to authenticate a user;
   in response to receiving the indication to authenticate the user, detecting a factor of a component of the information handling device, the component required for a preferred authentication method of a list of authentication methods and the factor affecting a capability of the component to detect authentication data for the preferred authentication method, wherein detecting the factor of the component comprises detecting whether the component is in electrical communication with the at least one processor, detecting whether the component is within a threshold distance from the at least one processor, determining whether the component is obstructed, or some combination thereof; and
   in response to detecting the factor of the, selecting a physically available authentication method from the list of authentication methods to authenticate the user into the operating system of the information handling device, the physically available authentication method including at least one of the component or an additional component of the information handling device.

7. The method of claim 6, wherein the preferred authentication method comprises a last used authentication method.

8. The method of claim 6, wherein the preferred authentication method comprises a user selected authentication method.

9. The method of claim 6, wherein the preferred authentication method comprises a most secure authentication method.

10. The method of claim 6, wherein the component comprises a camera, a fingerprint scanner, a retinal scanner, a keyboard, a cell phone, a touchscreen, a mouse, or some combination thereof.

11. The method of claim 6, wherein detecting the factor of the component comprises determining whether data obtained from the component has a quality above a threshold quality level.

12. The method of claim 6, wherein the list of authentication methods to authenticate the user is ranked from most preferred authentication method to least preferred authentication method.

13. The method of claim 12, wherein the authentication method selected from the list of authentication methods is ranked higher in the list of authentication methods than other physically available authentication methods in the list of authentication methods.

14. The method of claim 6, further comprising receiving user input to rank the list of authentication methods.

15. The method of claim 6, further comprising using historical data to rank the list of authentication methods.

16. A program product comprising a non-transitory computer readable storage medium that stores code executable by at least one processor, the executable code comprising code to perform:

receiving, by use of the at least one processor of an information handling device and at an operating system of the information handling device, a software interrupt, the software interrupt comprising, an indication to authenticate a user into the operating system;

in response to receiving the indication to authenticate the user, detect a factor of a component of the information handling device, the component required for a preferred authentication method of a list of authentication methods and the factor affecting a capability of the component to detect authentication data for the preferred authentication method, wherein detecting the factor of the component comprises detecting whether the component is in electrical communication with the at least one processor, detecting whether the component is within a threshold distance from the at least one processor, determining whether the component is obstructed, or some combination thereof; and in response to detecting the factor of the component, selecting a physically available authentication method from the list of authentication methods to authenticate the user into the operating system of the information handling device, the physically available authentication method including at least one of the component or an additional component of the information handling device.

17. The program product of claim 16, wherein detecting the factor of the component comprises determining whether data obtained from the component has a quality above a threshold quality level.

18. The program product of claim 16, wherein the list of authentication methods to authenticate the user is ranked from most preferred authentication method to least preferred authentication method.

19. The program product of claim 18, wherein the physically available authentication method selected from the list of authentication methods is ranked higher in the list of authentication methods than other physically available authentication methods in the list of authentication methods.

20. The program product of claim 16, wherein the executable code further comprises code to perform receiving user input to rank the list of authentication methods.

* * * * *